Patented July 9, 1946

2,403,435

UNITED STATES PATENT OFFICE 2,403,435

PARASITICIDE COMPOSITION

Oscar H. Hammer, South Haven, Mich., assignor to The Dow Chemical Company, Midland, Mich., a corporation of Michigan No Drawing. Application January 30, 1943, Serial No. 474,176

5 Claims. (Cl. 167—39)

This invention relates to improvements in parasite control and is particularly directed to a novel fumigant composition.

In my application 474,175, filed concurrently herewith, is claimed the use of the material in combatting plant parasites.

Volatile organic liquids have been employed in fumigation procedures for the control of a variety of insect pests, the scope of the operation varying from large scale fumigation of enclosed chambers, rooms, and buildings to the spot fumigation of restricted areas, e. g. borer control adjacent to plants, soil fumigation, etc. The problems attendant to such fumigation practices vary with the particular pest to be controlled and the conditions under which the control is to be accomplished.

Emulsions of ethylene chloride, propylene chloride, and other liquid halo-hydrocarbons have been suggested as toxicants for the control of borer organisms adjacent to living plants and have replaced solid para-dichlorobenzene for such purpose to an appreciable extent. These halo-hydrocarbons serve essentially as fumigants and are more effective at low soil temperatures than is para-dichlorobenzene whereby they may be employed in the late fall, early spring, or even in winter. The use of para-dichlorobenzene is generally limited to the warm summer months.

While the use of emulsions of the volatile organic liquids for spot fumigation constitutes an improvement over the use of the unmodified liquids, disadvantages in such procedure have become apparent which threaten to limit substantially the scope of the new practice. One major problem encountered in this connection is that of maintaining the effective toxicant in sufficiently uniform dispersion to permit close regulation of the amounts applied. The inadequate mixing and application equipment employed by the average operator permits the breaking or stratification of the emulsion during application whereby some trees or plants will be exposed to an excessively large amount of the toxicant and others to an amount insufficient to accomplish the desired control. This results in inconsistent control of borers and other parasitic organisms with substantial injury and destruction of the trees receiving an overdose of toxicant.

A further difficulty is directly attributable to the flow characteristics of liquid fumigants and of aqueous emulsions thereof as heretofore employed. These compositions are of such low viscosity that, when applied to soil around the plant, the liquid tends to be absorbed quickly into the ground and to flow into fissures and soil cracks whereby the root system of the plant is exposed to lethal concentrations of the toxicant. Such inability to control the distribution of toxicant, coupled with its high volatility, may result in severe injury with the eventual destruction of the tree by amounts of material well within normal tolerance limits.

According to the present invention, an improved fumigant composition is provided including a volatile liquid fumigant dispersed in exploded mica. Such composition is adapted to be employed in fumigation operations generally and is particularly of value where a gradual liberation of toxicant over a considerable period of time is desired. A further advantage of the composition resides in the ease with which it may be handled. Thus, application is accomplished simply by broadcasting the product about within an enclosed chamber whereby the volatile liquid composition is gradually given off as a vapor to build up the desired toxic concentration of the fumigant, and the solid carrier is recoverable at the conclusion of the operation. An alternate procedure comprises opening a container of the composition within the fumigation chamber or zone and permitting the gradual evaporation of the liquid fumigant. By such operations the necessity for specialized pressure equipment, vaporizers, applicators, and the like is avoided.

A preferred use for the composition of the present invention is for the control of borers and other soil organisms customarily attacking the roots and lower surfaces of plants. This is accomplished by sterilizing the soil adjacent to the plant and building up such a concentration of fumigant as to destroy the borer and other organisms without at the same time causing plant injury. Such sterilization is obtained with the present composition simply by applying the latter in contact with the soil and adjacent to the plant, or in a trough dug in the soil adjacent to the plant. The applied material advantageously may be blanketed with soil. By proceeding in this fashion it has been found that many of the difficulties previously characterizing borer control with volatile liquid fumigants are overcome and plant protection accomplished with a maximum of economy and a minimum of injury to the plant.

Among the advantages inherent to such practice is the convenience with which it is accomplished. Here, as in general fumigation operations, no specialized equipment is required since the problem of stratification is substantially avoided whereby no mixing or agitation of the composition during application is necessary. As there is no problem of maintaining the liquid fumigant in dispersion, the possibility of overdosing or underdosing a given plant is avoided, and the application to trees or plants of equal volumes or weights of the composition insures that an exactly equivalent amount of liquid fumigant will be made available in each instance. Also, by reason of its physical nature, it is impossible for the new composition to soak or run into soil cracks so that injury to the root system of the plant does not occur. The liquid phase of the fumigant is held by the carrier at the exact point of application, and is slowly vaporized out of the mixture so as to maintain in the critical area an effective concentration of toxicant over a much longer period of time than when the unmodified liquid fumigant or an emulsion thereof, is employed.

The exploded mica employed as a carrier in the present composition is non-reactive with liquid fumigants and non-injurious to plant life. This product is employed in coarsely subdivided state as a mixture of particles varying from about $\frac{1}{64}$ to $\frac{1}{2}$ inch in diameter. The particle size of the carrier may be somewhat larger or smaller in certain instances depending upon the use for which the composition is designed and the nature of the liquid fumigant employed. Unique properties of the exploded mica which make it particularly satisfactory in the present composition are the difficulty with which it absorbs water and the particular manner in which it takes up volatile organic liquids. The water repellent nature of mica substantially precludes the displacement of organic liquids held therein by water. This feature is important in the use of the composition in soil fumigation and the like. Furthermore, it has been observed that the mica holds the liquid organic fumigant principally by absorption rather than adsorption and is not perceptibly swollen or softened thereby, so that compositions may be obtained containing a high proportion of liquid to carrier which retain their free-flowing characteristics and do not become sticky or gummy so as to pack together and cause problems of handling and application.

Any suitable liquid fumigant may be employed in combination with exploded mica as herein described. Representative of such materials are ethylene chloride, propylene chloride, isopropylbenzene, beta,beta'-dichloro-diethyl ether, tetrachloroethylene, monochlorobenzene, carbontetrachloride, chloroform, trichloroethylene, chloropicrin, etc. Similarly, mixtures of two or more of the foregoing, or solutions of gaseous fumigants therein, are suitable, e. g. a solution of methyl bromide in isopropyl-benzene, a solution of methyl bromide in ethylene chloride-carbontetrachloride mixture, a mixture of ethylene chloride and carbontetrachloride, a mixture of trichloroethylene and propylene chloride, etc.

The new compositions are readily prepared by wetting the exploded mica with the liquid fumigant, draining off any excess of the liquid, and packaging the product in air-tight containers. The exact proportions of liquid fumigant and exploded mica in the composition vary over a wide range depending upon the specific gravity of the liquid fumigant, the state of subdivision of the exploded mica, etc. Generally the amount of liquid fumigant employed is equal to from 1 to 4 times the weight of carrier, although smaller amounts are obviously operable. Where compositions are desired which contain less than the maximum amount of liquid fumigant, a convenient mode of operation includes first placing the mica in the ultimate container, adding the desired amount of liquid fumigant, and thereafter closing the container. Upon standing, the liquid fumigant distributes itself uniformly throughout the body of the mica.

The amount of the composition applied adjacent to the individual plant varies with the tolerance of the plant for vapors of the particular liquid fumigant concerned, the soil temperature at the time of application, the concentration of fumigant in the mica, and the particular borer or other soil organism to be controlled. Since the liquid fumigant is given off by the mica over an appreciable period of time, somewhat larger amounts of fumigant may safely be employed on plants than is possible when using the unmodified fumigant material or emulsions thereof. However, it has been found that adequate control of parasites is obtained when the amount of fumigant present in the applied mixture is roughly equivalent to that ordinarily recommended for the fumigant alone or in emulsified form. The expression "borers and soil organisms" as herein employed includes larvae and mature insect pests, nematodes, disease inducing microorganisms, etc.

The following examples illustrate the invention but are not to be construed as limiting the same:

EXAMPLE 1

Compositions were prepared by dispersing a number of volatile liquid fumigants in coarsely subdivided exploded mica. This was accomplished by introducing the mica into a container, adding the liquid fumigant, sealing the container, and storing the latter at room temperature for 12 hours. At the end of this time, the liquid fumigant in each instance was found to have distributed itself uniformly throughout the body of the exploded mica. The various compositions were then applied to the soil adjacent to a number of 10–12 year old peach trees, and the degree of control of existing borer insects determined over a period of several weeks. The compositions were applied by forming a ring of the solid mixture around and in contact with each tree and thereafter throwing up a blanket of soil around the tree and over the composition. The following compositions and data are representative:

*Composition A*

| | Parts by weight |
|---|---|
| Exploded mica | 150 |
| Ethylene chloride | 377 |
| | 527 |

105 gram portions of this product were applied to the soil in rings around and against the trunks of the peach trees to kill 100 per cent of peach tree borers infesting the soil and lower bark and crown of the subject trees.

*Composition B*

| | Parts by weight |
|---|---|
| Exploded mica | 150 |
| Propylene chloride | 350 |
| | 500 |

In a similar fashion 100 gram portions of this composition were applied to the soil and in contact with the peach trees to obtain a kill of 96 per cent of borer organisms.

Composition C

| | Parts by weight |
|---|---|
| Exploded mica | 150 |
| Ortho-dichlorobenzene | 392 |
| | 542 |

108 gram portions of this mixture, when similarly employed, gave an average kill of 75 per cent of borer organisms.

EXAMPLE 2

In an operation to determine whether or not the new fumigant compositions were injurious to growing plants, a number of one year old peach saplings were contacted with compositions including volatile organic fumigants dispersed in exploded mica. The compositions employed were as follows:

Composition D

| | Parts by weight |
|---|---|
| Exploded mica | 150 |
| Ethylene chloride | 226 |
| | 376 |

37.6 gram portions of this mixture were employed in a ring around and in contact with each tree trunk at soil level.

Composition E

| | Parts by weight |
|---|---|
| Exploded mica | 150 |
| Propylene chloride | 210 |
| | 360 |

36 gram portions of this product were similarly applied to each tree trunk at soil level.

Composition F

| | Parts by weight |
|---|---|
| Exploded mica | 150 |
| Ortho-dichlorobenzene | 235 |
| | 385 |

38.5 gram portions of this composition were similarly applied.

Observation of the treated trees over a considerable period following application, and inspection of the cambium layer thereof adjacent to the point of contact of the fumigant compositions, indicated a substantial absence of injury attributable to the use of the described compositions. The amounts of liquid fumigant actually present in the compositions as applied, were approximately 4 times those ordinarily recommended for application to one year old peach trees.

EXAMPLE 3

Compositions were prepared in which exploded mica was saturated with various liquid organic fumigants. This was accomplished by wetting the coarsely subdivided mica with an excess of the liquid fumigant concerned and then allowing that portion not absorbed to drain out of the mixture over a period of 5 minutes. The increase in weight of the carrier was taken as the amount of liquid fumigant absorbed. Determinations were then made to ascertain the comparative volatility of the several fumigant liquids from out of the mixtures. The following data are representative of the compositions employed and results obtained:

Composition G

| | Parts by weight |
|---|---|
| Exploded mica | 100 |
| Methyl bromide 10% by weight | |
| Ethylene chloride 67.5% by weight | 140 |
| Carbontetrachloride 22.5% by weight | |
| | 240 |

This mixture contained 45 parts of liquid constituent after being spread in a thin layer and standing one hour at room temperature. After 2 hours, 4.5 parts by weight of the active fumigant was still retained by the carrier.

Composition H

| | Parts by weight |
|---|---|
| Exploded mica | 100 |
| Beta, beta'-dichloro-diethyl ether | 205 |
| | 305 |

After 144 hours exposure at room temperature this mixture still retained 64 parts by weight of the dichloro-diethyl ether.

Composition I

| | Parts by weight |
|---|---|
| Exploded mica | 100 |
| Ethylene chloride | 155 |
| | 255 |

After 2.5 hours exposure under similar conditions, 20 parts by weight of ethylene chloride was still present in the exploded mica.

Composition J

| | Parts by weight |
|---|---|
| Exploded mica | 100 |
| Ortho-dichlorobenzene | 203 |
| | 303 |

After 144 hours standing at room temperature, this composition still contained 12 parts by weight of ortho-dichlorobenzene.

In the foregoing example, Compositions G, H, I, and J, are each adapted to be employed in fumigation operations generally, or for the treatment of the soil adjacent growing plants in the manner described under Examples 1 and 2.

While the compositions as set forth above have consisted essentially of liquid fumigants and exploded mica, it is to be understood that warning agents, difficultly-volatile high-boiling organic liquids, etc., may be incorporated therewith if desired.

The expression "exploded mica" as herein employed is inclusive of any micaceous mineral such as biotite, muscovite, phlogopite, lepidolite, and particularly vermiculite which has been subjected to such treatment as to produce a modified mica product of the type described as expanded, exfoliated, swollen, or intumesced.

I claim:

1. A coarsely subdivided, free-flowing fumigant composition including a dispersion of a volatile liquid fumigant in exploded mica, the average particle size of the mica carrier being at least 1/64 inch in diameter.

2. A coarsely subdivided free-flowing fumigant composition including a dispersion of a volatile liquid halohydrocarbon in exploded mica, the average particle size of the mica carrier being at least 1/64 inch in diameter.

3. A coarsely subdivided free-flowing fumigant composition including a dispersion of ethylene chloride in exploded mica, the average particle size of the mica carrier being at least $^1/_{64}$ inch in diameter.

4. A coarsely subdivided free-flowing fumigant composition including a dispersion of propylene chloride in exploded mica, the average size of the mica carrier being at least $^1/_{64}$ inch in diameter.

5. A coarsely subdivided free-flowing fumigant composition including a dispersion of β.β'-dichloro-diethyl ether in exploded mica, the average particle size of the mica carrier being at least $^1/_{64}$ inch in diameter.

OSCAR H. HAMMER.